United States Patent [19]
Talisa et al.

[11] Patent Number: 5,878,334
[45] Date of Patent: Mar. 2, 1999

[54] HIGH TEMPERATURE SUPERCONDUCTING LOW POWER RECEIVER PROTECTOR/ CLUTTER AUTOMATIC GAIN CONTROL FOR RADAR RECEIVER

[75] Inventors: Salvador H. Talisa, Pittsburgh, Pa.; Carl E. Nothnick, Pasadena, Md.; Steven N. Stitzer, Ellicott City, Md.; Sumantrai D. Patel, Silver Spring, Md.; James D. Woermbke, Pasadena, Md.

[73] Assignee: Northrop Grumman Corporation, Los Angeles, Calif.

[21] Appl. No.: 724,569

[22] Filed: Sep. 30, 1996

[51] Int. Cl.$^6$ ............... H04B 1/06; H04B 1/16
[52] U.S. Cl. ........... 455/217; 455/235.1; 455/242.1; 333/81 A
[58] Field of Search ............... 455/217, 234.1, 455/234.2, 235.1, 242.1, 249.1, 250.1, 254, 223, 210, 308; 333/17.2, 81 A, 81 R, 161; 361/91, 110, 111, 119

[56] References Cited

U.S. PATENT DOCUMENTS

| | | | |
|---|---|---|---|
| 4,138,637 | 2/1979 | Weinert | 333/81 R |
| 4,169,219 | 9/1979 | Beard | 455/235.1 |
| 5,036,527 | 7/1991 | Halim et al. | 455/242.1 |
| 5,128,636 | 7/1992 | Furutani et al. | 455/217 |
| 5,282,842 | 2/1994 | Buck et. al. | |
| 5,472,935 | 12/1995 | Yandrofski et al. | 333/161 |
| 5,678,214 | 10/1997 | Azuma | 455/217 |

OTHER PUBLICATIONS

"What's New With Receiver Protectors?" By Steven N. Stitzer Microwave Magazine, Jan. 1976.

"An Overload Protected Low–Noise X–Band FET Amplifier" by E.C. Niehenke and T.E. Steigerwald, presented at the 1983 IEEE MTT–S International Microwave Symposium.

*Primary Examiner*—Thanh Cong Le
*Assistant Examiner*—Sam Bhattacharya
*Attorney, Agent, or Firm*—Walter G. Sutcliff

[57] ABSTRACT

The present invention provides for a low power receiver protector and stepped attenuator for conditioning a received input signal within a microwave receiver front end. The low power receiver protector includes a detector for generating a surge signal in response to the received input signal exceeding a predetermined threshold, a delay line for delaying the received input signal for fixed duration, and a limiter for reducing the voltage of the received input signal in response to the generation of the surge signal. The stepped attenuator includes a plurality of cells each having an attenuation transmission path which includes an attenuator for providing a predetermined amount of attenuation of the received input signal. Each attenuation transmission path, bypass transmission path and delay line comprise a high temperature superconductor to provide minimal loss and reduced size.

11 Claims, 6 Drawing Sheets

HIGH TEMPERATURE SUPERCONDUCTING LOW POWER RECEIVER PROTECTOR/ CLUTTER AUTOMATIC GAIN CONTROL FOR RADAR RECEIVER

BACKGROUND OF THE INVENTION

1. Field of the Invention

This invention relates to low power receiver protector/ clutter automatic gain control circuitry for microwave receiver front ends and more particularly to a high temperature superconducting low power receiver protector/clutter automatic gain control.

2. Description of the Related Art

Receiver protectors act as fast acting sophisticated circuit breakers to prevent damage to sensitive radar receivers. This damage can result from power reflected from the antenna during the transmit period or from nonsynchronous pulses due to high power EMI or high power jamming. The receiver protector should provide certain common characteristics such as low insertion loss, fast recovery period and low leakage power under a wide spectrum of environmental conditions and over a wide range of power level and ambient temperatures. They should also have an operating life of at least several thousand hours with a high degree of reliability.

The clutter automatic gain control (CAGC) within a radar receiver is a variable attenuator used to adjust the clutter signal level to a prescribed level. This prescribed level is typically 6 dB below the saturation level of the analog to digital converter within the radar receiver.

The clutter automatic gain control is utilized to provide a uniform return signal allowing the receiver to monitor a smaller range of signals. Generally, the clutter automatic gain control provides high attenuation immediately following the transmit pulse and subsequently steps the attenuation down in a prescribed manner (e.g., linear ramp of attenuation over time) to monitor targets at a farther distance.

Clutter automatic gain controls are also designed to have a low power receiver protection function (LPRP) against the transmitter power leakage which can be on the order of 10 watts following the conventional high power receiver protection function (HPRP). The power allowed into the low noise amplifier within the radar receiver must not exceed 15 dBm typically. An additional level of receiver protection is usually achieved by turning the clutter automatic gain control to maximum (snuff) attenuation (60 dB typical) during the transmit cycle.

Conventional radar receivers use PIN diodes as variable attenuators. These attenuators have a dynamic range which is limited by an input third order intercept (ITOI) on the order of 30 dBm. In addition, the conventional devices have a low intercept point which may vary with attenuation. It is preferred to provide a high intercept point which remains constant during fluctuations in attenuation to avoid distortion.

The PIN diodes are usually biased within the conventional devices such that the received high level signal will trigger the PIN diode. Such an arrangement provides instantaneous protection by creating a large loss within the low power receiver protector and clutter automatic gain control.

The attenuation within the conventional devices could be controlled by varying the current to the PIN diodes. However, this configuration is not preferred inasmuch as the PIN diodes cause intermodulation when the PIN diodes are not completely on or completely off.

Conventional Receiver protector/Sensitivity Time Controls (RP/STC) in radar systems are usually either waveguide or microstrip devices. The waveguide versions have low insertion loss, less than 1 dB at X-band (10 GHz). However, they may be quite large (e.g., 2"×2"×6" at X-band to 8"×8"×24" at L-band (1–2 GHz)). Such devices are designed to protect against high power leakage from the transmitter and utilize glass or quartz vials containing gas which becomes an ionized plasma under high power. The gas stages can handle (i.e., reflect) these high power levels, but provide no protection below about 10–20 watts of RF power. The gas stages are followed by several diode stages containing PIN diodes shunted across the waveguide to attenuate the reduced power following the gas stages.

The limiter diodes may also be utilized as a controlled attenuator stage since variable attenuation STC function is desired. The attenuation is set by feeding a controlled current through the diodes. Utilization of the limiter diodes as a STC attenuator reduces the number of diodes required and the overall insertion loss.

The limiter diodes are made with a thin I-region to protect at low power, and the diodes begin to turn on under strong receive signal conditions. This produces undesirable third-order mixing products and cross-modulation which can produce false targets and/or hide desired targets in noise.

Microstrip versions of the RP/STC have also been used in conventional applications. These versions consist entirely of diode stages but have limited power handling capability (e.g., 20 W max). They are used in T/R modules and other applications where the waveguide versions can not be utilized. The insertion loss of the microstrip versions of the RP/STC is about twice that of the waveguide diode stages. A typical STC attenuator is required to provide 45–60 dB attenuation.

Therefore, there is a need for a low power and very low loss receiver protector/clutter automatic gain control for radar receiver with an increased dynamic range and which can be optimized for third-order intercept (high limiting thresholds) without hurting the noise figure of the system.

SUMMARY OF THE INVENTION

The present invention provides for a low power receiver protector for conditioning a received input signal within a microwave receiver front end. The low power receiver protector in accordance with the present invention includes a detector for generating a surge DC signal in response to the received input RF signal exceeding a predetermined threshold. The detector preferably comprises a diode and amplifier.

The present invention additionally includes a delay line for delaying the received input signal for fixed duration. The low power receiver protector additionally includes a limiter electrically connected to the detector and the delay line. The limiter reduces the voltage of the received input signal in response to the generation of the surge signal. The limiter preferably includes at least one PIN diode.

The low power receiver protector of the present invention may further comprise a directional coupler electrically connected to the detector and the delay line. The directional coupler is utilized to obtain a sample of the received input signal. A bias control network electrically connected to the detector and limiter may be provided for biasing the at least one PIN diode in response to the generation of the surge signal.

The present invention additionally provides for a stepped attenuator for use in a microwave receiver front end. The stepped attenuator includes a plurality of cells each having an attenuation transmission path which includes an attenuator for providing a predetermined amount of attenuation of the received input signal. The attenuator may include a plurality of thin-film resistors arranged in a T-network or π-network.

The stepped attenuator may include a bypass transmission path and at least one switch for selectively applying the received input signal to one of the attenuation transmission path and the bypass transmission path within the respective cell. The at least one switch is preferably coupled with a system controller which controls the operation of the switch. The attenuation transmission path and the bypass transmission path are preferably of equal electrical length.

Each attenuation transmission path, bypass transmission path and delay line comprise a high temperature superconductor. Utilizing a high temperature superconductor provides minimal loss and compact receiver front-end components. The high temperature superconductor may be selected from a group consisting of Y—Ba—Cu—O and Tl—BA—Ca—Cu—O and is preferably configured as microstrip, stripline and coplanar waveguide.

A complete understanding of the invention will be obtained from the following description and the accompanying figures.

DETAILED DESCRIPTION OF THE PREFERRED EMBODIMENTS

The present invention is described with reference to radar applications but it is to be distinctly understood that the present invention may be utilized with other microwave receivers.

Figure 1:
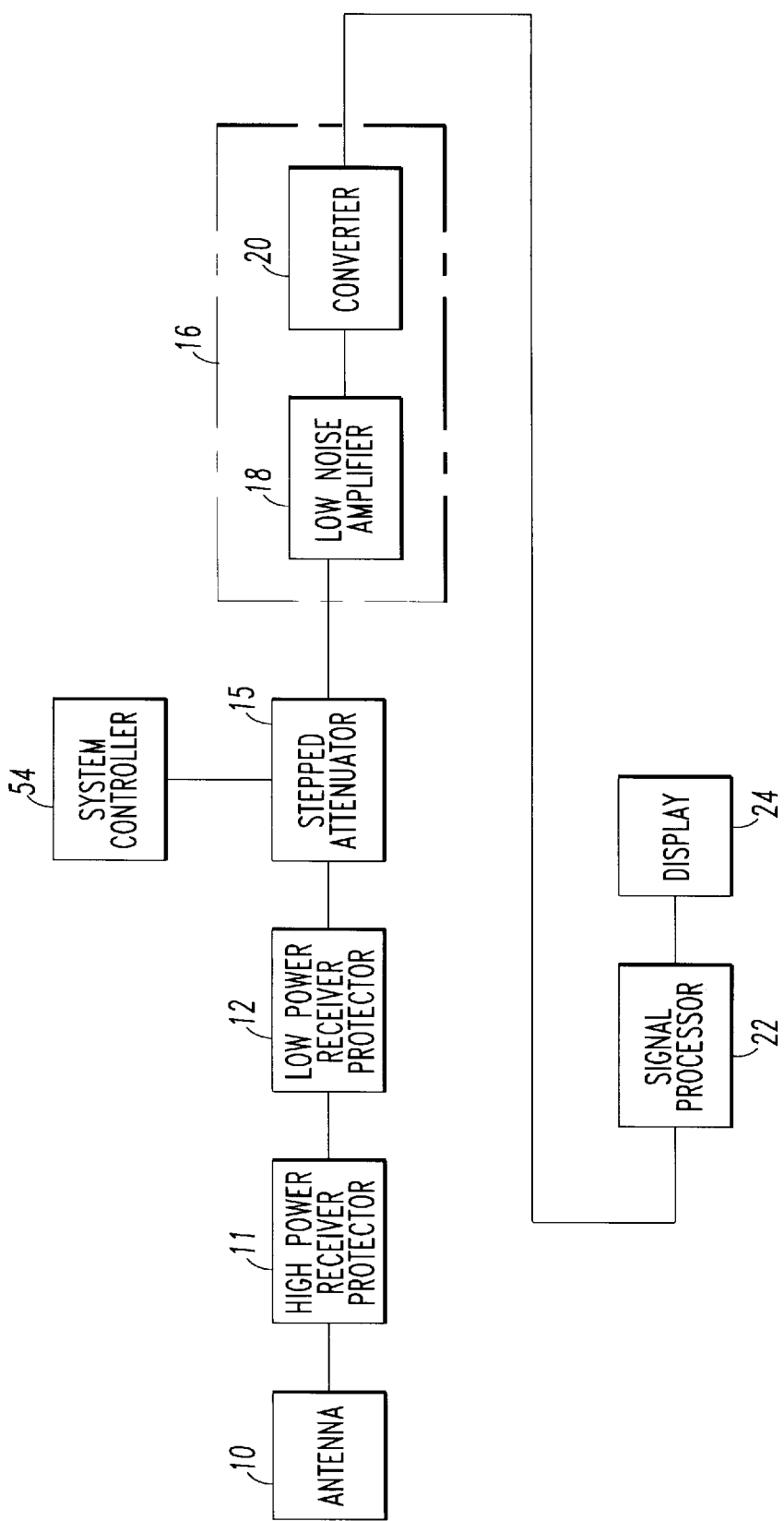
FIG. 1 is a functional block diagram of a received signal path within a microwave receiver.

Referring to FIG. 1, the echoes of the radar transmission are received by a radar antenna 10. The received echoes are forwarded to a front-end high power receiver protector 11 and a low power receiver protector 12. The low power receiver protector 12 protects sensitive components within the radar receiver 16 from power reflected from the radar antenna 10 during the transmit period or from nonsynchronous pulses due to high-power EMI or high-power jamming.

The output of the low power receiver protector 12 may be forwarded to a clutter automatic gain control. The clutter automatic gain control is a stepped attenuator 15 utilized to adjust the clutter signal level to a prescribed level below the saturation level of the analog-to-digital converter within the receiver.

Providing the low power receiver protector 12 and stepped attenuator 15 in different devices utilizes the advantages of PIN diodes without incurring the conflicting requirement of low limiting threshold and high input third order intercept.

In the stepped attenuator 15 in accordance with the present invention, the switching elements (e.g. PIN diodes) are either fully on or fully off. This results in the highest possible input third-order intercept. The conventional analog PIN diode attenuators utilize diodes which are only partially biased on thereby producing a low input third-order intercept. This forces the use of PIN diodes having a thick I-region to maximize the input third-order intercept. The thick PIN diodes are more difficult to turn on and do not offer protection at low input RF levels.

The output from the clutter automatic gain control 15 is applied to a low noise amplifier (LNA) 18 and an IF converter 20 within the radar receiver 16. The output of the radar receiver 16 may be applied to a signal processor 22 and the received transmission echoes may be conveyed via display 24.

Figure 2:
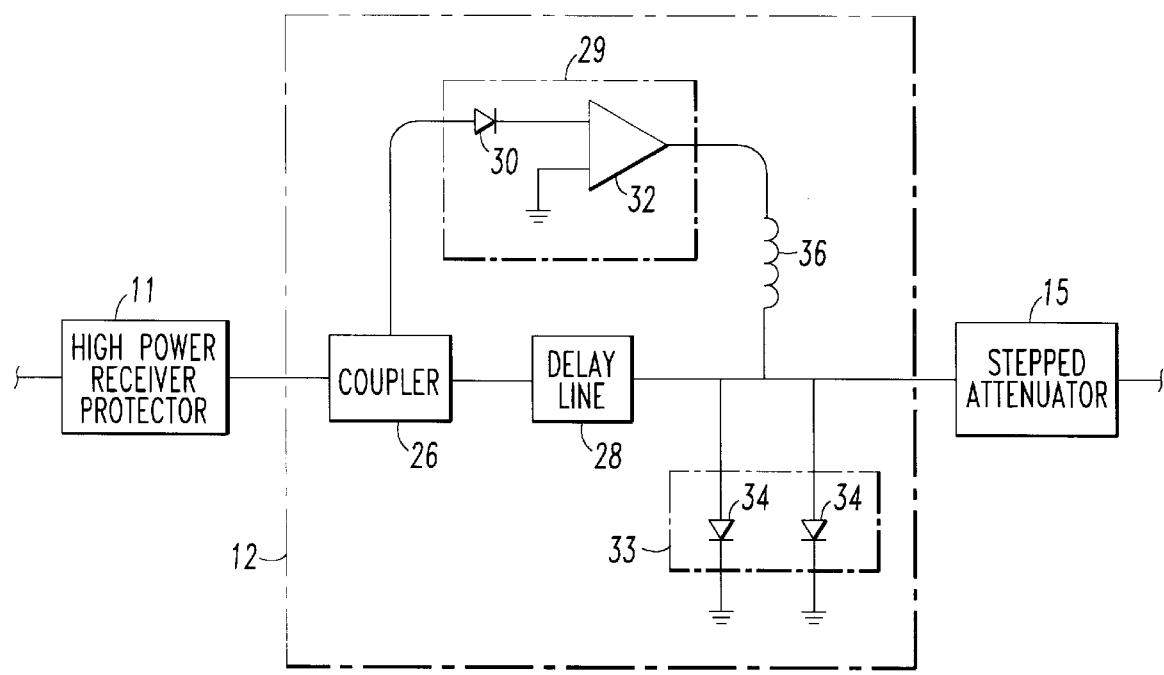
FIG. 2 is a schematic diagram of an embodiment of a low power receiver protector in accordance with the present invention.

An embodiment of the low power receiver protector 12 in accordance with the present invention is shown in detail in FIG. 2. The low power receiver protector 12 utilizes at least one PIN diode 34 to accomplish the power protection function without simultaneously imposing the low input third-order intercept (ITOI) inherent in the PIN diodes 34 to the receive path.

The antenna 10 may be coupled with the high power receiver protector 11 which is coupled with the low power receiver protector 12. The received signal is applied to a directional coupler 26 within the low power receiver protector 12. The signal is sampled and simultaneously routed to a delay line 28. The sampled signal is used to set the limiting threshold in the limiter 33.

In particular, the sampled signal is applied to a detector 29. One embodiment of the detector 29 includes a detector diode 30 and amplifier 32. The detector diode 30 may pass a high power signal to amplifier 32 if the sampled signal exceeds a predetermined value. A surge signal (amplified high power signal) is generated by the amplifier 32 and applied to the bias control network 36 for biasing the limiter 33 in an ON state. It is to be understood that alternative means for detecting voltages above a predetermined threshold are encompassed within the scope of the present invention.

The bias control network 36 supplies current to a limiter 33 in response to the generation of a surge signal. The bias control network may comprise a series inductance or a more complex low pass filter to provide an essentially DC bias signal to the PIN diodes 34.

The limiter 33 reduces the voltage of the received input signal when biased in an ON state to protect sensitive components with the microwave receiver 16 (LNAs). One embodiment of the limiter 33 includes at least one PIN diode 34. In particular, the PIN diodes 34 may clamp the voltage of the received input signal when biased in an ON state via the bias control electronics 36.

Preferably, the limiting threshold of the PIN diodes 34 is set at a high level to avoid lowering the input third-order intercept. Biasing the PIN diodes 34 in an ON state is preferably limited to the presence of a high power condition to reduce large losses in the received signal which result from continuous biasing of the PIN diodes 34.

The low power receiver protector 12 in accordance with the present invention additionally includes a delay line 28. The delay line 28 is interposed between the directional coupler 26 and PIN diodes 34 to store the signal and compensate for the increased time (approximately 20–50 nsec) required for biasing the PIN diodes 34 in the ON state.

The high power signal is stored within the delay line 28 and applied to the biased PIN diodes 34. The PIN diodes 34 subsequently operate to reflect the received high power signal for protecting the radar receiver 16.

The delay line 28 is preferably a planar (e.g., microstrip, stripline or coplanar waveguide) high temperature superconductor (HTS) to reduce the physical size and insertion loss within the delay line 28. The high temperature superconductor is preferably one of Y—Ba—Cu—O (YBCO) and Ti—Ba—Ca—Cu—O (TBCCO). An embodiment of the delay line 28 is described in United States patent application entitled "High-Temperature Superconducting Microwave Delay Line," filed Jun. 7, 1995, having Ser. No. 08/486,656 and hereby incorporated by reference.

The delay lines 28 preferably provide a 20–50 nsec delay to allow sufficient time for the PIN diodes 34 within the limiter 33 to be biased ON. A 20–50 nsec delay line 28, fabricated of a high temperature superconductor, can be made with 1 dB of loss at 10 GHz and a noise figure of 0.3 dB. The noise figure in a cooled passive device is lower than the insertion loss of the device. The fractional (F=>1) noise figure is given by $F=1+(L-1)T/290$, where L is the fractional loss (L=>1) and T is the temperature of the device in Kelvin. The high temperature superconductor may be cooled with one of liquid nitrogen, liquid helium, or a closed-cycle refrigerator.

Figure 3:
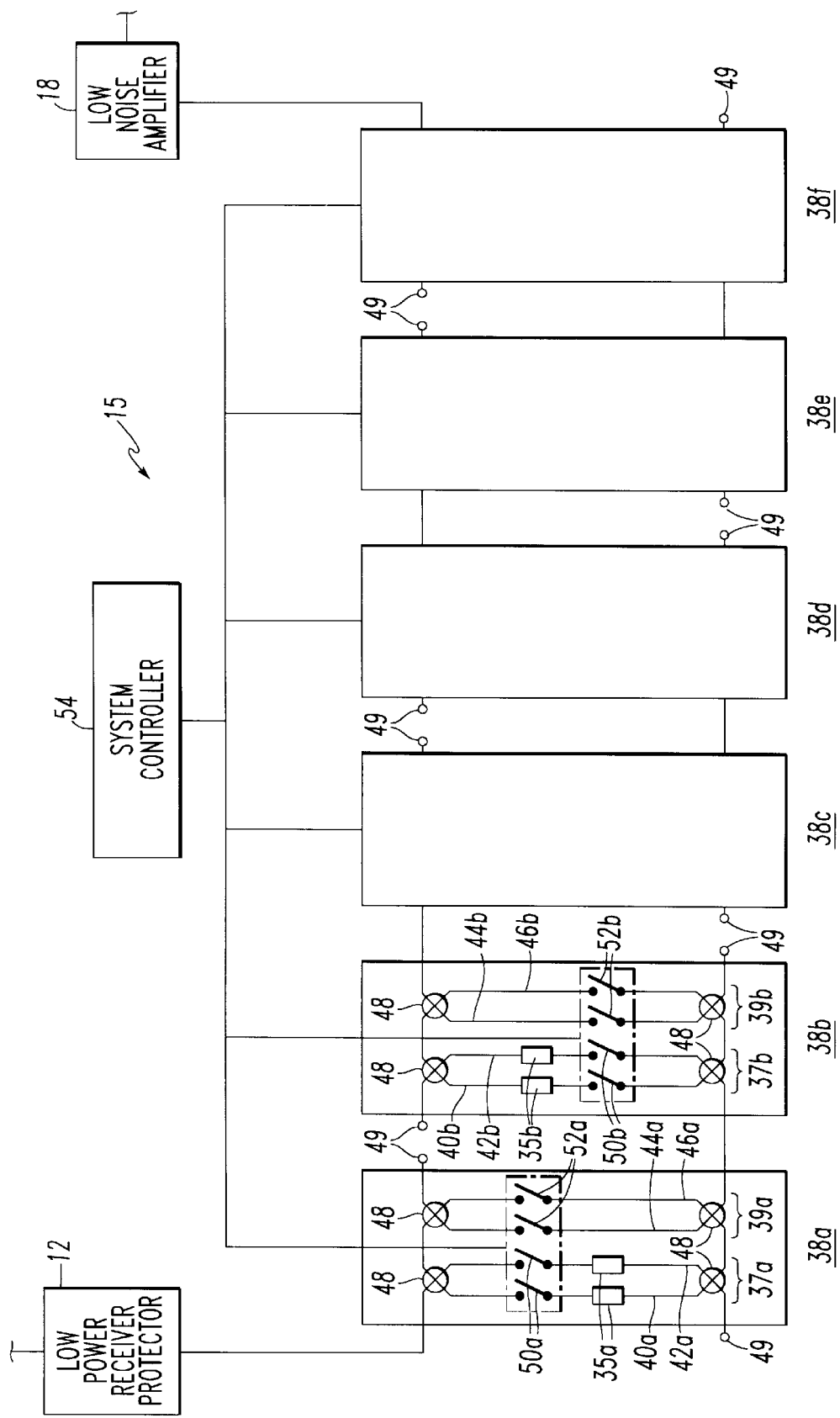
FIG. 3 is a schematic diagram of a first embodiment of a stepped attenuator in accordance with the present invention.

Because the delay line 28 and the stepped attenuator 15 may be cryogenically cooled to near boiling liquid nitrogen temperature (77 K), the noise figure is lower than the insertion loss and the desirable attenuation may be set with the benefit of a lower noise figure. The input third order intercept is expected to be greater than 40 dBm. The output of the low power receiver protector 12 may be applied to a stepped attenuator 15. As illustrated in FIG. 3, the stepped attenuator 15 includes a plurality of cells 38a–f which individually provide a predetermined amount of attenuation. For example, cells 38a–f may respectively provide 1, 2, 4, 8, 16, and 32 dB of attenuation. Cells 38a and 38b are shown in detail. The remaining cells are similar to these, with cells 38c and 38e having the same orientation as cell 38a, and cells 38d and 38f having the same orientation as cell 38b.

Each cell 38 includes an attenuation transmission path 37, bypass transmission path 39, a plurality of couplers 48, switches 50–52 and terminations 49. An embodiment of terminations 49 is described in detail in U.S. Pat. No. 5,693,595 entitled "Integrated Thin-Film Terminations For High Temperature Superconducting Microwave Components," and incorporated herein by reference.

In addition, the transmission paths 37,39 are preferably of equal electrical length. Each attenuation transmission path 37 passes through an attenuator 35a–f which can be made up of a lossy section of transmission line or a resistive network within the respective cell 38a–f for providing a predetermined amount of attenuation. The attenuators 35 may include thin-film resistors forming a T-network or π-network. The attenuators 35 may be integrally formed within the switches 50 or the high temperature superconductor transmission lines 40,42.

Each attenuation transmission path 37a–f includes two respective transmission lines 40a–f,42a–f and each bypass transmission line 39a–f includes two respective transmission lines 44a–f,46a–f as shown in FIG. 3.

The transmission lines 40,42,44,46 preferably comprise a planar (e.g., microstrip, stripline and coplanar waveguide) high temperature superconductor, such as Y—Ba—Cu—O (YBCO) and Tl—Ba—Ca—Cu—O (TBCCO). Transmission lines 40,42,44,46 fabricated of high temperature superconductors provide negligible loss.

The stepped attenuator 15 in accordance with the present invention may include 50 ohm coplanar transmission lines 40,42,44,46 having strips wider than 50 ohm microstrip to provide higher power handling.

The output of the low power receiver protector 12 is applied to a 90° hybrid coupler 48 within the first cell 38a. The hybrid coupler 48 splits the signal into one of the attenuation transmission lines 40a,42a or the bypass transmission lines 44a,46a depending upon the configuration of switches 50a,52a.

Each switch 50–52 may comprise an etch-back MOSFET (EB-FETs) to provide minimum loss of the received input signal and maximum isolation when in the OFF state. In addition, the EB-FET switches 50–52 are in a pinch-off state when ON and are therefore not expected to limit the linear behavior of the stepped attenuator 15. A suitable etch-back MOSFET is described in U.S. Pat. No. 5,252,842 to Buck et al.

Other types of field effect transistors may be utilized as switches 50–52 within the stepped attenuator 15 in accordance with the present invention. For example, pseudomorphic high electron mobility transistors (PHEMTs) may be utilized instead of EB-FETs.

A system controller 54 controls all switches 50–52 to provide the appropriate attenuation within the stepped attenuator 15. In particular, the signal is attenuated by attenuator 35a within cell 38a if respective switches 50a are closed and switches 52a are open. Alternatively, attenuator 35a is bypassed (no attenuation of the received input signal) if respective switches 50a are open and switches 52a are closed.

The total amount of attenuation throughout the stepped attenuator 15 is obtained through the operation of switches 50–52 responsive to the system controller 54. For example, switches 50b,d,e, and 52a,c,f are closed and all other switches opened if 26 dB attenuation is required.

All switches 50–52 are preferably open during a transmit cycle in order to improve isolation in all cells 38a–38f as an additional mode of protection of the radar receiver 16.

The minimum loss is set by the insertion loss in each of the switches 50–52 (six in series) in their ON position and the loss in the transmission paths 40,42. GaAs switches for cryogenic applications indicate insertion losses of 0.2 to 0.3 dB per switch at 77 K or a total of 1.2 to 1.8 dB.

Figure 4:
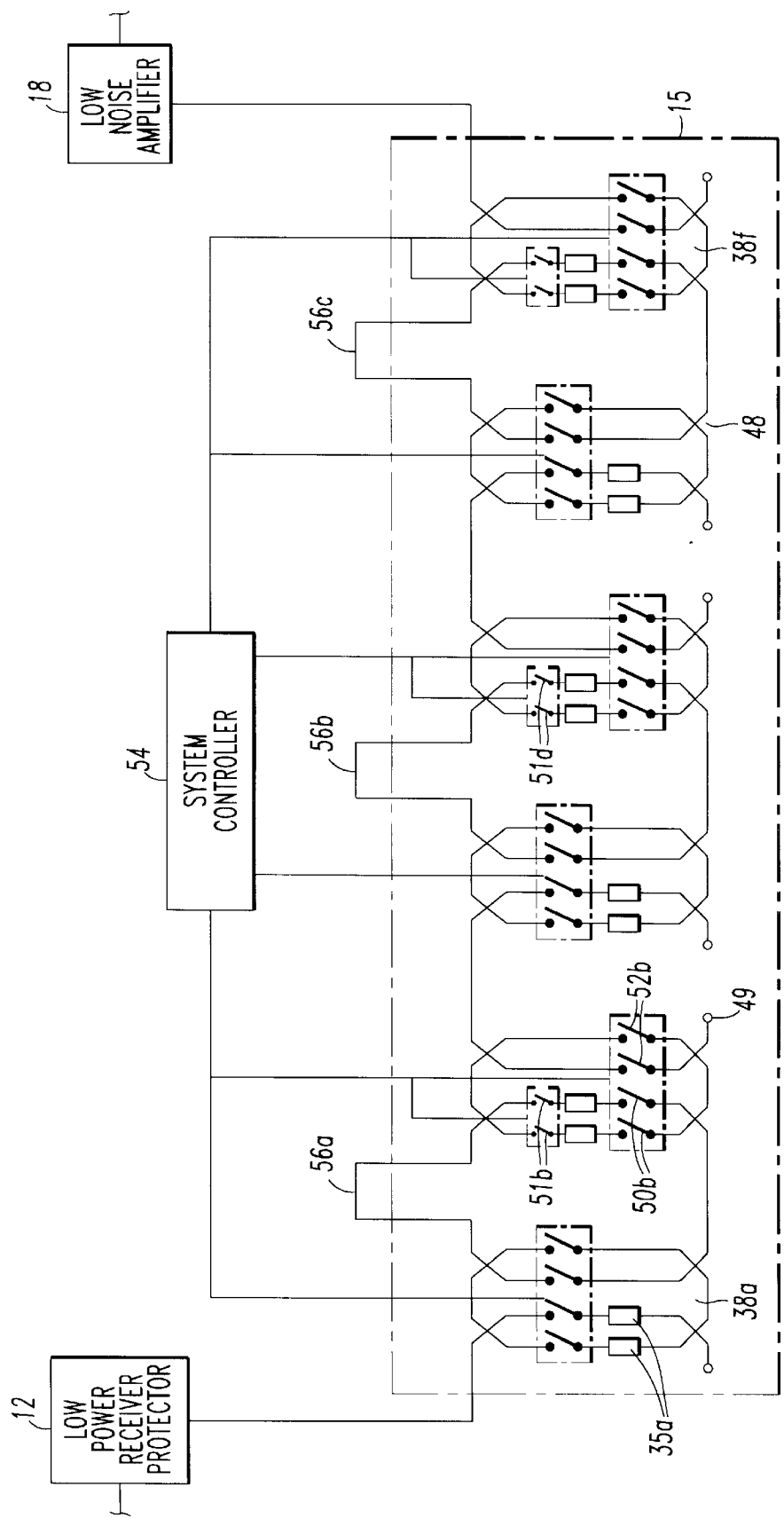
FIG. 4 is a schematic diagram of a second embodiment of a stepped attenuator.

Referring to FIG. 4, a second embodiment of the stepped attenuator 15 is shown. The stepped attenuator 15 includes low-loss, high temperature superconductor transmission lines 56a–c for providing minimum attenuation. In particular, all switches 50–52 are opened when minimum attenuation is desired and the received signal flows through the upper hybrid couplers 48 and the low-loss transmission lines 56a–c. The interference is negligible within the low-loss transmission path 56 and any interference results from minimum leakage through the open switches 50–52. Switches 51b,51d,51f are provided to prevent attenuators 35b,35d,35f from attenuating a signal within the low-loss transmission path 56. Switches 51 may be operated responsive to commands by system controller 54 and are opened when minimal attenuation is desired.

The line lengths of the low-loss transmission lines 56a–c are preferably adjusted to provide the same amount of delay that is imposed through the attenuation and bypass transmission paths 37 and 39.

Figure 5:
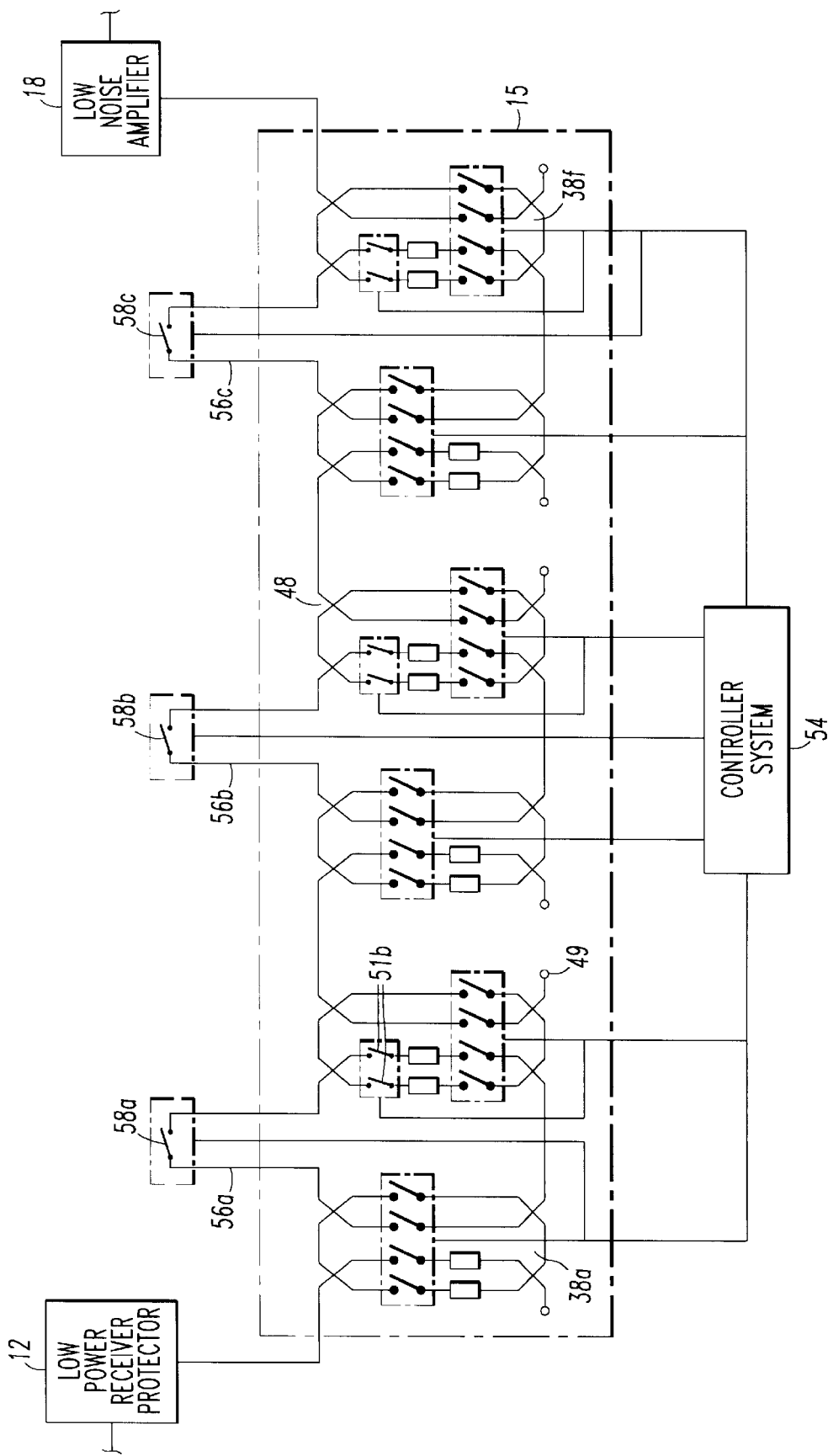
FIG. 5 is a schematic diagram of a third embodiment of a stepped attenuator.

A third embodiment of the stepped attenuator 15 in accordance with the present invention is shown in FIG. 5. The high temperature superconductor low-loss transmission path 56 includes a plurality of series switches 58a–c. The series switches 58a–c are controlled by the system controller 54.

The inclusion of series switches 58a–c increases the insertion loss within the low-loss transmission line 56. However, providing series switches 58a–c enhances isolation and reduces leakage through the low-loss transmission path 56 of the stepped attenuator 15. Reducing leakage through line 56 increases the design flexibility of the stepped attenuator 15 in accordance with the present invention.

Switches 51b,51d,51f are provided to prevent attenuators 35b,35d,35f from attenuating a signal within the low-loss transmission path 56. Switches 51 may be controlled by system controller 54.

Figure 6:
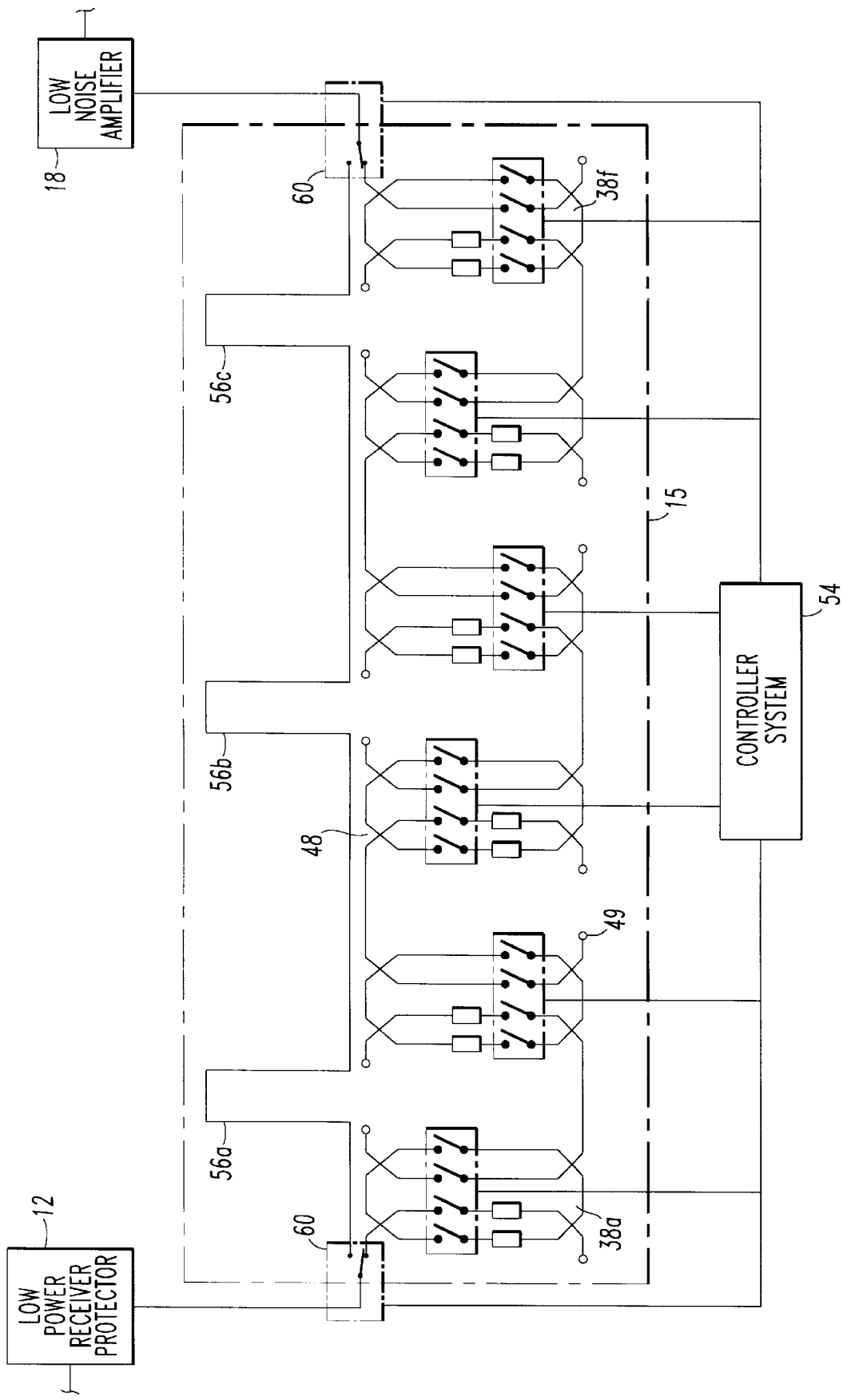
FIG. 6 is a schematic diagram of a fourth embodiment of a stepped attenuator.

A fourth embodiment of the stepped attenuator 15 in accordance with the present invention is shown in FIG. 6. In particular, single pole-double-throw (SPDT) switches 60 may be provided at the input and output of the stepped attenuator 15. The SPDT switches 60 are coupled with the system controller 54 and may selectively route the received signal through the cells 38 or low-loss transmission line 56. The use of SPDT Switches 60 is advantageous inasmuch as only two switches are utilized within the entire low-loss transmission path 56 thereby reducing the losses therein.

The target requirements of the low power receiver protector 12 and the stepped attenuator 15 in accordance with the present invention are shown in Table 1.

Table 1—HTS CAGC Requirements

Operating Frequency Range: 9.0 to 11.0 GHz (8.5 to 14 GHz desirable)
Input Power (Transmit Leakage): 10 W avg.; 10 W peak
Output Power (Transmit 15 dBm max. (Max. LNA input) Leakage):
Loss and Noise Figure: <0.5 dB at minimum CAGC attenuator setting
Input Third-Order Intercept >50 dBm (ITOI):
CAGC Attenuation Range/Step 60 dB in 1 dB steps Size:
Switching Speed: 20 ns max.
CAGC Control Lines: 6 bit TTL
Snuff Attenuation: 60 dB step, 20 ns rise/fall, 0.1 to 100 $\mu$s duration
Recovery Time Following <200 ns Transmit Pulse Trailing Edge:
VSWR: <1.3:1 on input and output ports
Interface: Waveguide
Phase Noise @2 KHz: <-166 dBc/Hz While preferred embodiments of the invention have been shown and described herein, it will be appreciated by those skilled in the art that various modifications and alternatives to the disclosed embodiments may be developed in light of the overall teachings of the disclosure. Accordingly, the disclosed embodiments are meant to be illustrative only and not limiting to the scope of the invention which is to be given the full breadth of the following claims and all equivalents thereof.

We claim:

1. A microwave receiver front-end for conditioning a received input signal, comprising:

a. a low power receiver protector having a detector for generating a surge signal responsive to the received input signal exceeding a predetermined threshold, and a high temperature superconductor delay line for delaying the received input signal for a fixed duration, and a limiter electrically connected to the detector and the delay line for reducing the voltage of the received input signal responsive to the generation of the surge signal; and b. a stepped attenuator electrically connected to the receiver protector and having a plurality of cells each having a high temperature superconductor attenuation path for providing a predetermined amount of attenuation, and each having a high temperature superconductor bypass path;

c. said attenuation path including first and second lines, and said bypass path including first and second lines;

d. a first hybrid coupler at a first end of said attenuation path and at a first end of said bypass path for splitting an applied signal between the first and second lines, and a second hybrid coupler at a second end of said attenuation path and at a second end of said bypass path for recombining the signal;

e. said attenuation path including a semiconductor switch operable in a fully on and fully off state of operation and said bypass path including a semiconductor switch operable in a fully on and fully off state of operation.

2. The microwave receiver front-end of claim 1 wherein the high temperature superconductor comprises a member selected from the group consisting of Y—Ba—Cu—O and Tl—Ba—Ca—Cu—O.

3. The microwave receiver front-end of claim 1 wherein the high temperature superconductor is patterned in one of microstrip, stripline and coplanar waveguide configurations.

4. The microwave receiver front-end of claim 1 further comprising a directional coupler electrically connected to the detector and the delay line and the directional coupler for obtaining a sample of the received input signal.

5. The microwave receiver front-end of claim 1 wherein the limiter comprises at least one PIN diode.

6. The microwave receiver front-end of claim 5 further comprising a bias control network electrically connected to the detector and limiter for biasing the at least one PIN diode responsive to the generation of the surge signal.

7. The microwave receiver front-end of claim 1 wherein the detector comprises a diode and an amplifier.

8. The microwave receiver front-end of claim 1 further comprising a system controller coupled with each at least one switch for controlling the operation thereof.

9. The microwave receiver front-end of claim 1 wherein the attenuation transmission path and the bypass transmission path are of equal electrical length.

10. The microwave receiver front-end of claim 1 further comprising a high temperature superconductor low-loss transmission path coupled with selective ones of the cells.

11. The microwave receiver front-end of claim 1 wherein the high temperature superconductor attenuation transmission path includes an attenuator.

* * * * *